United States Patent
Ding et al.

(10) Patent No.: US 8,547,868 B2
(45) Date of Patent: ***Oct. 1, 2013

(54) CROSS-LAYER APPROACH TO VIRTUALIZED OVERLAY ON AD HOC NETWORKS

(75) Inventors: Gang Ding, San Diego, CA (US);
Sanjay Rungta, Phoenix, AZ (US);
John Vicente, Roseville, CA (US);
Winson C. Chan, Sacramento, CA (US);
Dilip Krishnaswamy, Carmichael, CA (US)

(73) Assignee: Intel Corporation, Santa Clara, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 13/104,768

(22) Filed: May 10, 2011

(65) Prior Publication Data
US 2011/0211481 A1    Sep. 1, 2011

Related U.S. Application Data

(63) Continuation of application No. 11/824,292, filed on Jun. 29, 2007, now Pat. No. 7,940,778.

(51) Int. Cl.
| H04J 1/16 | (2006.01) |
| H04J 3/14 | (2006.01) |
| H04L 1/00 | (2006.01) |
| H04L 12/26 | (2006.01) |

(52) U.S. Cl.
USPC .......................................................... 370/252

(58) Field of Classification Search
None
See application file for complete search history.

(56) References Cited

U.S. PATENT DOCUMENTS

| 6,055,575 | A | 4/2000 | Paulsen et al. |
| 6,681,116 | B1 | 1/2004 | Johnson |
| 6,765,921 | B1 | 7/2004 | Stacey et al. |
| 7,940,778 | B2 * | 5/2011 | Ding et al. ............... 370/395.53 |
| 7,975,040 | B2 * | 7/2011 | Du et al. ....................... 709/223 |
| 8,280,431 | B2 * | 10/2012 | Sedayao et al. ............ 455/550.1 |
| 2002/0064149 | A1 | 5/2002 | Elliott et al. |
| 2002/0094799 | A1 | 7/2002 | Elliott et al. |
| 2004/0028003 | A1 | 2/2004 | Diener et al. |
| 2004/0081105 | A1 | 4/2004 | Shimazaki et al. |
| 2005/0021713 | A1 | 1/2005 | Dugan et al. |
| 2005/0198286 | A1 | 9/2005 | Xu et al. |
| 2005/0204042 | A1 | 9/2005 | Banerjee et al. |
| 2005/0215287 | A1 | 9/2005 | Efland et al. |
| 2006/0140124 | A1 | 6/2006 | Asmare et al. |
| 2006/0155806 | A1 | 7/2006 | Du et al. |
| 2007/0189249 | A1 | 8/2007 | Gurevich et al. |
| 2007/0294496 | A1 | 12/2007 | Goss et al. |
| 2008/0039055 | A1 | 2/2008 | Hannikainen et al. |

(Continued)

OTHER PUBLICATIONS

Vicente et al., "Overlays on Wireless Mesh Networks:Implementation and Cross-Layer Searching", Oct. 27, 2006, 34 pages.

(Continued)

*Primary Examiner* — Hassan Phillips
*Assistant Examiner* — Prenell Jones
(74) *Attorney, Agent, or Firm* — Caven & Aghevli LLC

(57) ABSTRACT

Methods and apparatus to a cross-layer approach to virtualized overlay on ad hoc networks are described. In one embodiment, a virtual address may be used to search for a (key,value) pair in a virtual overlay. Other embodiments are also described.

20 Claims, 5 Drawing Sheets

(56) References Cited

U.S. PATENT DOCUMENTS

| | | | |
|---|---|---|---|
| 2008/0117861 A1* | 5/2008 | Balandina et al. | 370/328 |
| 2008/0162625 A1 | 7/2008 | Sedayao et al. | |
| 2009/0003353 A1* | 1/2009 | Ding et al. | 370/395.53 |
| 2009/0094380 A1 | 4/2009 | Qiu et al. | |

OTHER PUBLICATIONS

Vicente et al., "OverMesh: Network-Centric Computing", IEEE Communications Magazine, Feb. 20, 2007, pp. 2-9.

Sedayao, "Intel IT Overlay", PatentLab Workshop at HPLABS, May 11, 2006, 7 pages.

Office Action received for U.S. Appl. No. 11/027,493, mailed on Jun. 2, 2009, 18 pages.

Office Action received for U.S. Appl. No. 11/027,493, mailed on Oct. 1, 2008, 13 pages.

Notice of Allowance received for U.S. Appl. No. 11/027,493, mailed on Nov. 23, 2009, 5 pages.

Office Action received for U.S. Appl. No. 11/824,292, mailed on Sep. 3, 2009, 8 pages.

Office Action received for U.S. Appl. No. 11/824,292, mailed on Apr. 28, 2010, 8 pages.

Notice of Allowance received for U.S. Appl. No. 11/824,292, mailed on Sep. 2, 2010, 6 pages.

Notice of Allowance received for U.S. Appl. No. 11/824,292, mailed on Jan. 3, 2011, 7 pages.

* cited by examiner

CROSS-LAYER APPROACH TO VIRTUALIZED OVERLAY ON AD HOC NETWORKS

RELATED APPLICATIONS

This application claims priority from and is a continuation of U.S. patent application Ser. No. 11/824,292 entitled "CROSS-LAYER APPROACH TO VIRTUALIZED OVERLAY ON AD HOC NETWORKS," filed Jun. 29, 2007, issued on May 10, 2011, as U.S. Pat. No. 7,940,778, which is hereby incorporated herein by reference and for all purposes.

BACKGROUND

The present disclosure generally relates to the field of computing. More particularly, an embodiment of the invention generally relates to a cross-layer approach to virtualized overlay on ad hoc networks.

Networking has become an integral part of computing. Some current implementations may rely on a hierarchical model of device networking, which governs positioning and roles for the entire system. Such implementations may however limit end-users' influence or control over how services are delivered to them.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Some of the embodiments discussed herein generally relate to a cross-layer approach to a virtualized overlay on ad hoc networks. For example, some proposed techniques may improve speed and/or efficiency with respect to provision of services in virtualized overlays implemented in wireless networks, in an embodiment, the techniques discussed herein may be applied in a virtualized overlay of a flat wireless (e.g., ad hoc) network. Moreover, some of the embodiments discussed herein may be implemented in various computing environments such as mobile wireless networks, including for example, local area mesh networks (such as those complying with institute of Electrical & Electronics Engineers (IEEE) 802.11s, April 2007), ultra wide band personal area networks, and WiMAX (e.g., complying with IEEE 802.16 wireless broadband standard, formed in June 2001 and amended thereafter).

Figure 1:
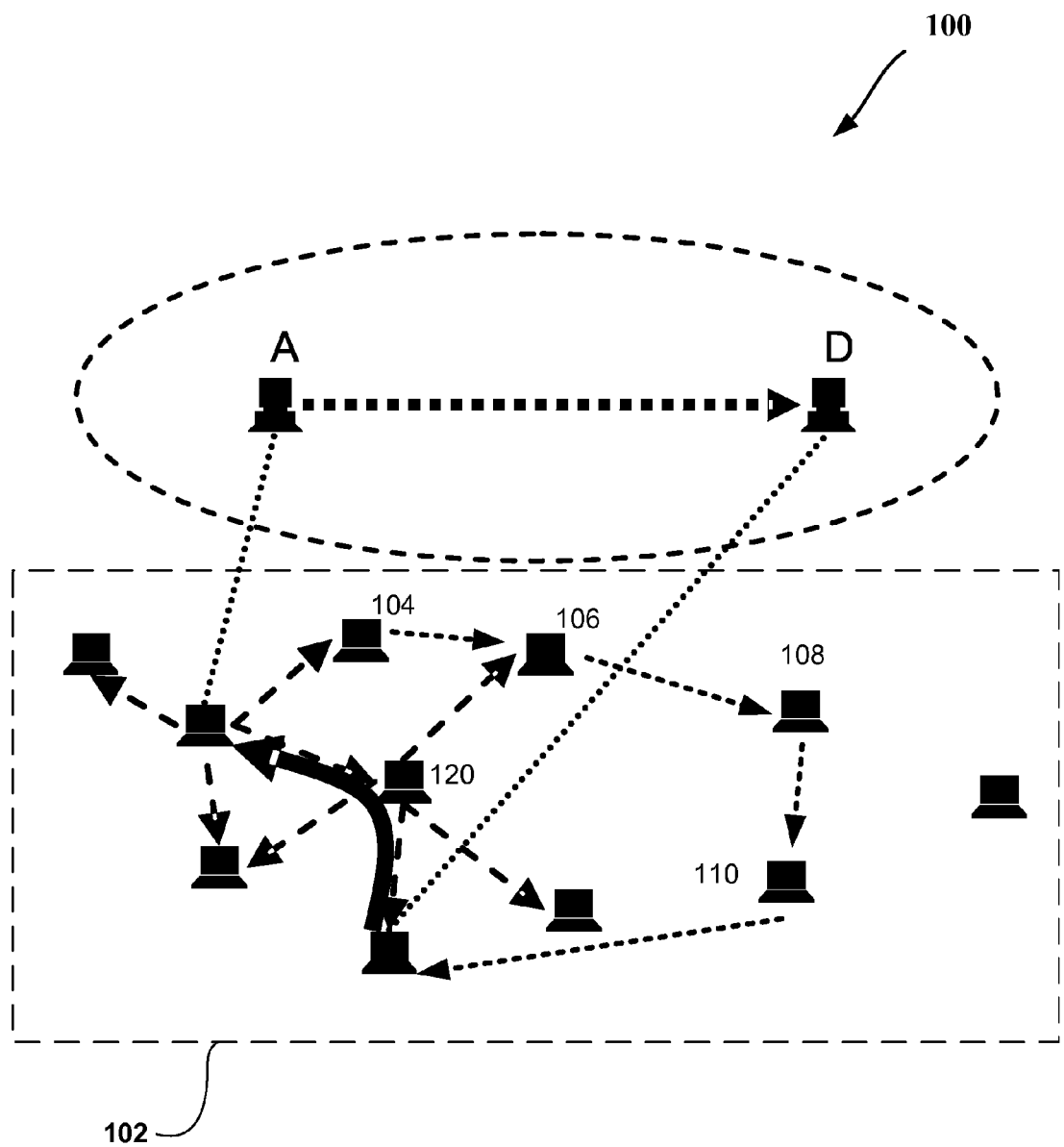
FIG. 1 illustrates a wireless system that utilizes a cross-layer overlay searching technique, accordingly to an embodiment.

FIG. 1 illustrates a wireless system 100 that utilizes a cross-layer overlay searching technique, accordingly to an embodiment. As shown in FIG. 1, a transmission from a node A to a node D of a wireless network 102 may be routed through various nodes in the wireless network 102. For example, some current solutions may rely on overlay work on wired networks which may route a packet from node A to node D through nodes 104, 106, 108, and 110. This approach may however not work efficiently in wireless networks, e.g., due to the resource constraints in wireless networks and/or the separation between upper overlays and lower networks. As a result, significant time delay and high packet loss rates may be experienced. In accordance with at least one embodiment, a cross-layer overlay searching technique may be utilized to route a packet from node A through a relatively more efficient route (e.g., through node 120) to node D, which may result in less delay and/or less likelihood of packet loss.

Cross-Layer Distributed Searching

Figure 2:
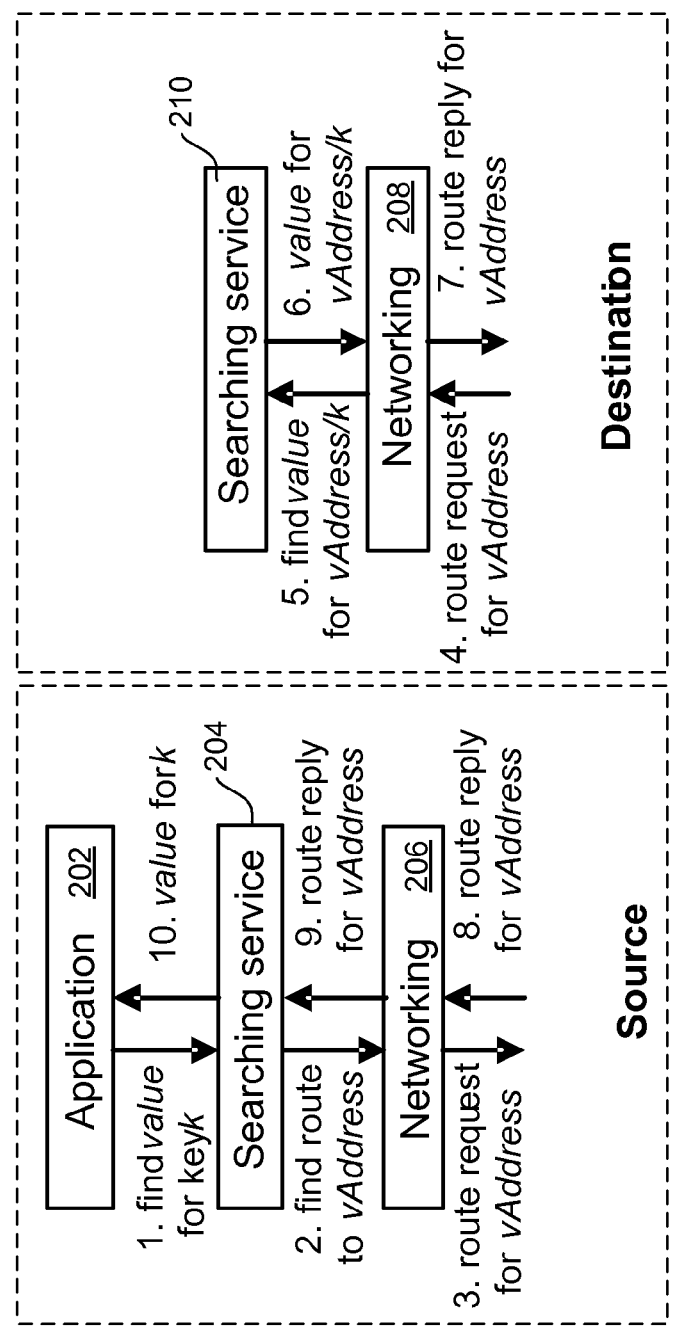
FIG. 2 illustrates a flow diagram of various cross-layer distributed searching data, in accordance with one embodiment.

FIG. 2 illustrates a flow diagram 200 of various cross-layer distributed searching data, in accordance with one embodiment. In some embodiments, a searching overlay provides a common lookup service to various applications such as information query and/or distributed file storage or sharing. For example, a (key, value) pair is stored in one of the (e.g., randomly) selected nodes in the overlay (such as any of the nodes shown in network 102 of FIG. 1). This information may be discoverable by other nodes in the overlay using some searching algorithm. Some current peer-to-peer overlay searching on wired networks may attempt to make the underlying network transparent to applications, but this may not be efficient for overlays on wireless networks. Given limited bandwidth, power, mobility and dynamic topology in wireless ad hoc networks, the searching algorithm may consider the network condition in lower layers in order to quickly find a requested key by using minimal network resources in accordance with some embodiments.

Moreover, at the physical layer, due to the broadcast nature of the wireless channel, every transmission from a node may be heard by all its neighbors. At the network layer, most widely used ad hoc routing protocols, such as AODV (Ad-Hoc on Demand Distance Vector) and DSR (Dynamic Source Routing), are based on broadcast. For example, whenever a source node wants to find a route to a destination node, the source may broadcast a route request. If any node receiving the request is the destination node or knows a route to the destination, it sends a reply back to the source; otherwise the route request is re-broadcasted. The complexity of broadcasting at the network and lower layers may be O(n) when the network size is n. When a distributed searching algorithm is implemented in the overlay above the network layer, one may not expect it to introduce more complexity than O(n). But even when the most efficient and scalable overlay searching algorithms based on distributed hash table (DHT) are utilized, it may need O(log n) virtual hops in the overlay while each virtual hop may require O(n) complexity to find the physical route. Thus, the lowest complexity achieved by some current techniques may be O(n log n).

Referring to FIG. 2, the embodiment shown may provide an overlay searching solution which may achieve the best complexity of O(n), for example, by using the network layer broadcast to route the searching request. When an application 202 of a source node knows a key k and wants to find its corresponding value (at operation 1), it may first map k to a virtual network address (vAddress) using some hash function. The hash function may be employed to make vAddress unique and randomly distributed in the network address space in an embodiment. For example, an indicia or mark may be embedded into vAddress so that it may be learned by other nodes in the searching overlay that this is a virtual network address. At an operation 2, a searching service 204 (e.g., implemented as part of a protocol stack of the source node, such as discussed with reference to FIG. 3) may be used to find a route to vAddress. At an operation 3, networking facilities 206 of the source node (such as a network physical layer or logic associated therewith) may broadcast a route request for this virtual network address (vAddress) to other nodes in the corresponding wireless network. Any node in the searching overlay (e.g., through its networking facilities 208) may then check the received route request and compare the requested virtual address against all the keys it has stored within its local or accessible storage at an operation 4. If the same key is found (at operation 4), the corresponding value is sent back to the source node (e.g., through the searching service 210 (which may be implemented as part of a protocol stack of the destination node, such as discussed with reference to FIG. 3)) at operations 5-7 as a route reply. As shown in FIG. 2, the route reply may be forwarded to the networking facilities 206 of the source node at operation 8 and from there to the searching service 204 at operation 9 and eventually to the initiating application 202 of the source node at an operation 10.

In some embodiments, the above techniques discussed with reference to FIG. 2 may be further enhanced. For example, when the value is sent back to the source, the intermediate node relaying such information may store or cache this (key, value) pair so that it may also respond when the same searching request comes through next time. In addition to storing (key, value) pairs, a node may also save the corresponding vAddress for each pair and/or sort them by vAddress, so it may search the list and respond to a route request faster. Accordingly, as shown in FIG. 1, by using the cross-layer searching techniques discussed herein (e.g., with reference to FIG. 2), the physically shortest route may be quickly found.

Cross-Layer Network Measurement and Monitoring

In some embodiments, given the resource constraints in the underlying wireless networks, many services and applications supported by the overlay may be aware of the current network condition by cross-layer information exchange. Instead of conducting such cross-layer operations in every node, a monitoring overlay including a subset of nodes may be dedicated to collecting underlying network information and provide such information to node(s) in the network or other upper-layer overlays. One piece of important information to collect is the wireless link quality. Each node in the monitoring overlay may measure the link quality between itself and its neighbors periodically. The link quality may be based on the received signal strength, the time-of-arrival, and so on. This overlay may serve as a small cover set so that any node in the system is in the neighborhood of at least one of the nodes in the overlay. This guarantees to monitor all nodes in the system in an embodiment. The link quality information may be queried by other overlays or applications with the help of the distributed searching service discussed herein, with reference to FIGS. 1-2. The collected data may be even accessed from the external network through the help of gateways.

Since some nodes may be moving in the ad hoc network, the monitoring overlay may also provide node location information in an embodiment. For a node in the overlay, if it is stationary, its position may be pre-measured. Otherwise, logic such as localization hardware including for example global positioning system (GPS) devices may be used to find the node's location in real time. The node may also measure and record the distance to its neighbors periodically. This may be based on the link quality or by ranging techniques. For example, by measuring the received signal strength, the distance between the transmitter and receiver may be estimated based on a given radio propagation model. The distance estimation may be refined by comparing the actual distance and estimated distance between two nodes that are both in the monitoring overlay because their actual locations may already be known. For a node A not in the overlay, it may enlist the help of nodes in the overlay to find its own location. In an embodiment, it may check with every neighbor B who is in the localization overlay and gets B's location and the distance from A to B. Given this information, node A may estimate its own location by any position estimation techniques such as triangulation.

Network Capacity Improvement

In some embodiments, mesh wireless networks may be designed to provide for scalable capacity as the number of mesh nodes increase in the wireless network. More particularly, in one embodiment, it might be useful to minimize the number of edges in an interference graph for the mesh network to increase the number of simultaneous transmissions possible (e.g., where an edge between two nodes in such a graph signifies that the nodes may not transmit at the same time as their transmissions will interfere with each other). Power control may be used to reduce the range of interference provided by a wireless transmission, so that an optimal reduced power may be used for transmission for the target signal-to-interference-plus-noise ratio. When multiple channels are available, mesh nodes may configure their radios to transmit data in different channels and thus transmit simultaneously even if they are in close proximity of each other. Each mesh node may have multiple radios such that these radios might be configured to receive and transmit on different channels, at the same time, for increased capacity in the network. Multiple-input, multiple-output (MIMO) antennas may be used in each radio in some embodiments to provide increased capacity at the physical layer with the use of multiple antennas for transmission and reception. Multiple antennas may also be used to provide increased range in the wireless network. In addition, one might consider hybrid mesh networks that provide support for multiple wireless protocols (such as WLAN (Wireless Local Area Network), UWB (Ultra-Wideband), cellular, and WiMAX) operating in different non-interfering frequency ranges. Accordingly, in some embodiments, communications using different wireless protocols may exist simultaneously and the nodes in the network may need support for radios to support various protocols or have software-defined-radio implementations to reconfigure radios to different wireless protocols dynamically.

Moreover, when reconfiguring a radio, the cost associated with switching may also be considered as that reduces the time that the radio is available for wireless communication. Therefore there are several dimensions to consider when improving capacity in the network, such as dynamic power management, the use of multiple channels, multiple radios, multiple antennas, and/or multiple protocols for wireless communications. The techniques discussed herein may help to improve the capacity of the mesh network to carry intra-mesh traffic. However, one may also consider the amount of extra-mesh traffic relative to intra-mesh traffic. Since a large fraction of the traffic in the mesh may have destinations external to the mesh that may exit through a mesh portal and a significant portion of the overall traffic may arrive into the mesh through a mesh portal, although the network may be scalable in its ability to early intra-mesh traffic, the network may experience a significant bottleneck for wireless transmissions and receptions at the mesh portals depending on the amount of extra-mesh traffic in the network. In an embodiment to alleviate such issues, the capacity scaling techniques discussed herein such as using MIMO antennas, multiple channels, and multiple radios at these mesh portals may be utilized. This may result in the design of fat-tree mesh networks with the higher capacity closer to the root of the tree such as at the mesh portals, with reduced capacity for nodes further away from the portals in an embodiment.

In addition to capacity-enhancing techniques fir network scalability, mesh networks implemented in accordance with some embodiments may also provide capabilities for adaptive dynamic routing and fault tolerance. Adaptive dynamic routing may be used to find alternate routes when intermediate nodes fail or when link conditions deteriorate on an existing route. When a mesh portal fails or if the demands on a mesh portal exceed its capacity, traffic may be dynamically routed to other mesh portals in an embodiment. This might cause additional delays in transmission that one may consider due to longer routes taken in the network. When a mesh portal is saturated, delay-sensitive traffic may be routed through the mesh portal, while re-routing other traffic along longer paths to other mesh portals, ensuring that end-to-end quality of service (QoS) constraints are satisfied for flows through the network. Moreover, heterogeneous mesh networks may provide additional flexibility in some embodiments. In a hybrid WLAN-WiMAX heterogeneous mesh network, for example, a mesh node with a WiMAX radio may potentially consider routing data through alternate paths such as through a WiMAX network to communicate data out of a mesh network when the WLAN mesh portals themselves have saturated links in an embodiment. A base-station in the WiMAX network may then serve as a mesh portal, or it might just forward data to another WLAN mesh portal that is further away. For intra-mesh traffic as well, even if source and destination nodes have the ability to connect through a WLAN mesh network, transmission flows may be optimized for intra-mesh traffic in an embodiment, e.g., by using a WiMAX network that provides increased range to communication data. In this case, one might reach destinations faster by traversing intermediate paths in the mesh network through a WiMAX network.

FIG. 1 illustrates a block diagram of a protocol stack 300 of a node who is a member of an overlay, according to an embodiment. In one embodiment, the node may share two of its three virtual machines (e.g., VM1 and VM3) to participate in cross-layer searching and monitoring overlays, respectively. As discussed with reference to FIG. 2, the cross-layer searching techniques discussed herein may find the physically shortest route to obtain the requested information with a complexity of O(n), in contrast to the complexity of O(n log n) when some current searching algorithms are used. A cross-layer monitoring overlay may be used to provide the information of the underlying networks to other nodes and other overlays. This may make it easier for other nodes and overlays to learn the network condition without conducting cross-layer information exchange by themselves as discussed herein.

Figure 3:
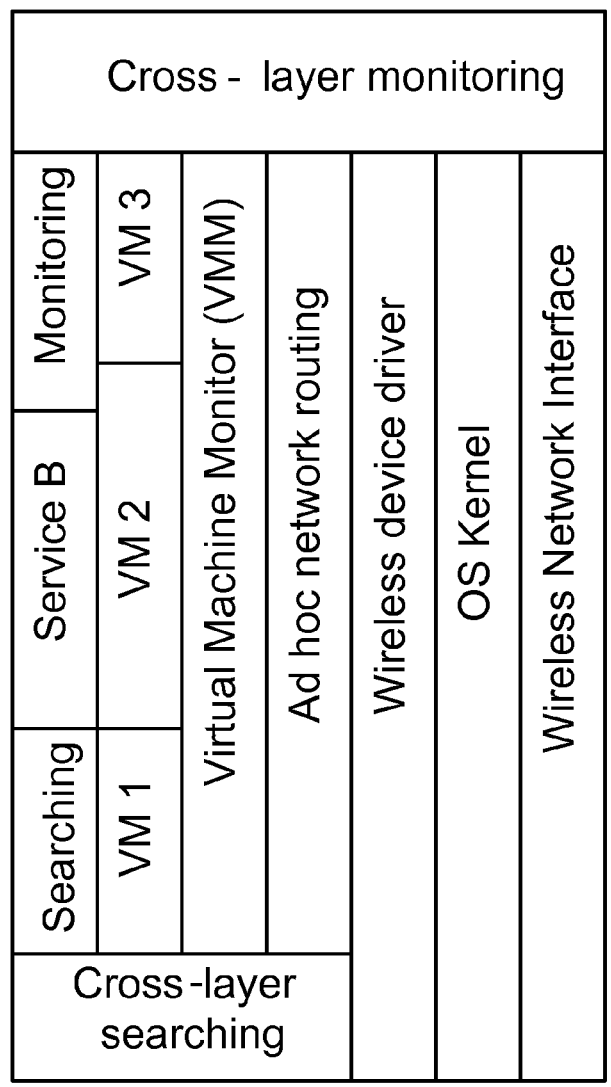
FIG. 3 illustrates a block diagram of a protocol stack of a node who is a member of an overlay, according to an embodiment.

As shown in FIG. 3, VW1 may be used for searching (e.g., cross-layer searching), VM2 for some service B, VM3 for monitoring (e.g., cross-layer monitoring), with a VMM (virtual machine monitor) module monitoring the operations of VM1, VM2, and VM3. More or less virtual machines may be provided in various embodiments. The stack 300 may also include an ad hoc network routing module, a wireless device driver, an operating system (OS) kernel (e.g., to manage system resources and the communication between hardware and software components), and/or a wireless network interface module (e.g., to facilitate communication via a network interface such as those discussed with reference to FIGS. 4 and 5).

Figure 4:
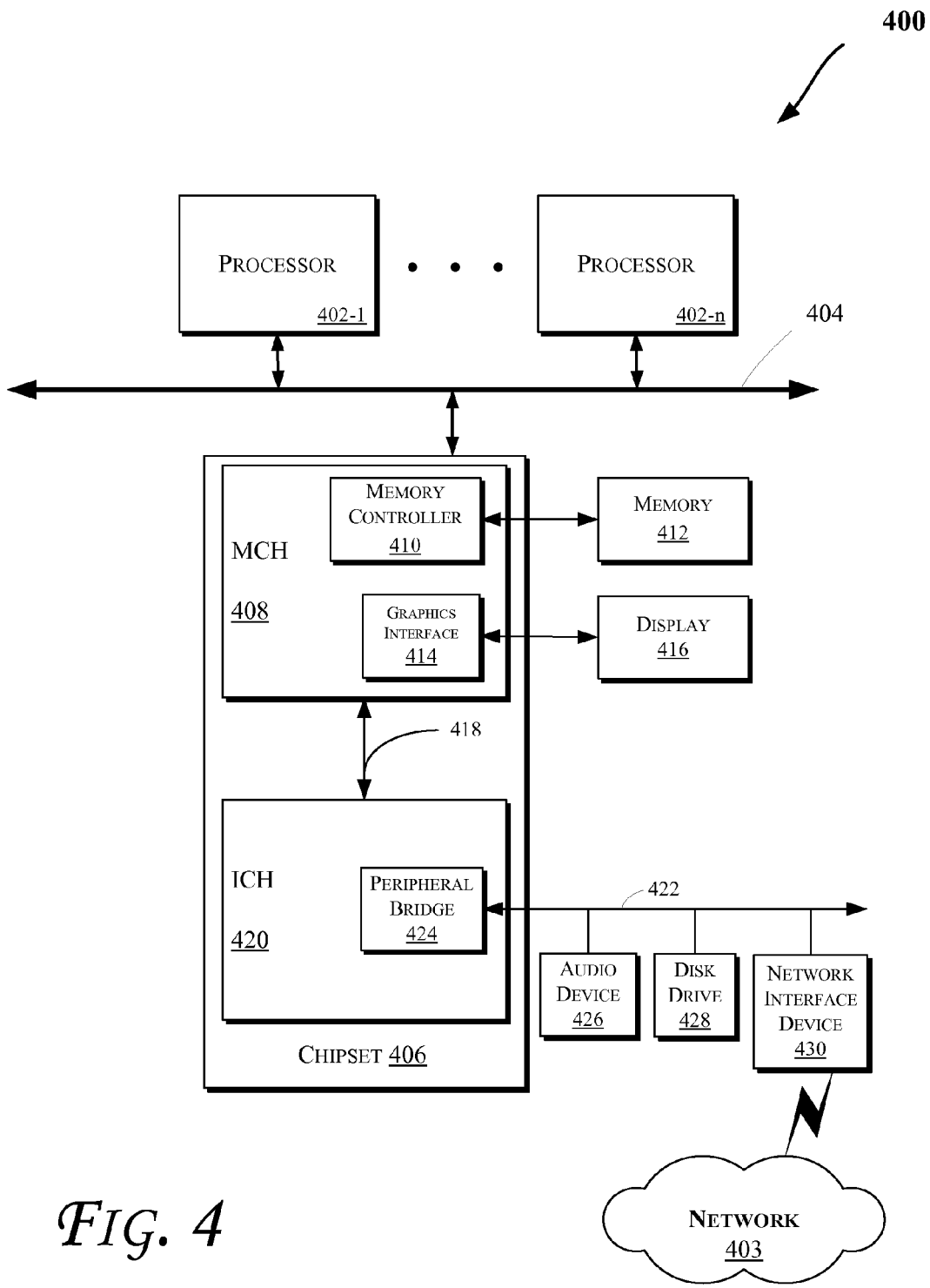
FIGS. 4 and 5 illustrate block diagrams of embodiments of computing systems, which may be utilized to implement some embodiments discussed herein.

The wireless nodes discussed herein (e.g., such as the nodes discussed with reference to FIGS. 1-4) may include various components. For example, each of the nodes may include one or more of the components discussed with reference to FIG. 4 or 5. More particularly, FIG. 4 illustrates a block diagram of a computing system 400 in accordance with an embodiment of the invention. The computing system 400 may include one or more central processing unit(s) (CPUs) 402 or processors coupled to an interconnection network (or bus) 404. The processors (402) may be any suitable processor such as a network processor (that processes data communicated over a computer network 403) or the like (including a reduced instruction set computer (RISC) processor or a complex instruction set computer (CIBC)). Moreover, the processors (402) may have a single or multiple core design. The processors (402) with a multiple core design may integrate different types of processor cores on the same integrated circuit (IC) die. Also, the processors (402) with a multiple core design may be implemented as symmetrical or asymmetrical multiprocessors. Additionally, the operations discussed with reference to FIGS. 1-3 may be performed by one or more components of the system 400.

A chipset 406 may also be coupled to the interconnection network 404. The chipset 406 may include a memory control hub (MCH) 408. The MCH 408 may include a memory controller 410 that is coupled to a memory 412. The memory 412 may store data and sequences of instructions that are executed by the processor(s) 402, or any other device included in the computing system 400. In an embodiment, the memory 412 may store one or more components of the stack 300 of FIG. 3.

In one embodiment of the invention, the memory 412 may include one or more volatile storage (or memory) devices such as random access memory (RAM), dynamic RAM (DRAM), synchronous DRAM (SDRAM), static RAM (SRAM), or the like. Nonvolatile memory may also be utilized such as a hard disk. Additional devices may be coupled to the interconnection network 404, such as multiple CPUs and/or multiple system memories.

The MCH 408 may also include a graphics interface 414 coupled to a display 416. In one embodiment of the invention, the graphics interface 414 may be coupled to the display 416 via an accelerated graphics port (AGP). In an embodiment of the invention, the display 416 (such as a flat panel display) may be coupled to the graphics interface 414 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display 416.

A hub interface 418 may couple the MCH 408 to an input/output control hub (ICH) 420. The ICH 420 may provide an interface to I/O devices coupled to the computing system 400. The ICH 420 may be coupled to a bus 422 through a peripheral bridge (or controller) 424, such as a peripheral component interconnect (PCI) bridge, a universal serial bus (USB) controller, or the like. The bridge 424 may provide a data path between the CPU 402 and peripheral devices. Other types of topologies may be utilized. Also, multiple buses may be coupled to the ICH 420, e.g., through multiple bridges or controllers. Moreover, other peripherals coupled to the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or the like.

The bus 422 may be coupled to an audio device 426, one or more disk drive(s) 428, and a network interface device 430 (which is coupled to the computer network 403). In one embodiment, the network interface device 430 may be a network interface card (NIC). Also, the device 430 may be a wireless network device to enable communication with other computing devices coupled to a wireless network (e.g., such as the network 403). Other devices may be coupled to the bus 422. Also, various components (such as the network interface device 430) may be coupled to the MCH 408 in some embodiments of the invention. In addition, the processor 402 and the MCH 408 may be combined to form a single chip. Furthermore, the graphics accelerator may be included within the MCH 408 in other embodiments of the invention.

Additionally, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk RUM (CD-ROM), a digital versatile disk (DVD) flash memory, a magneto-optical disk, or other types of nonvolatile machine-readable media suitable for storing electronic instructions and/or data.

Figure 5:
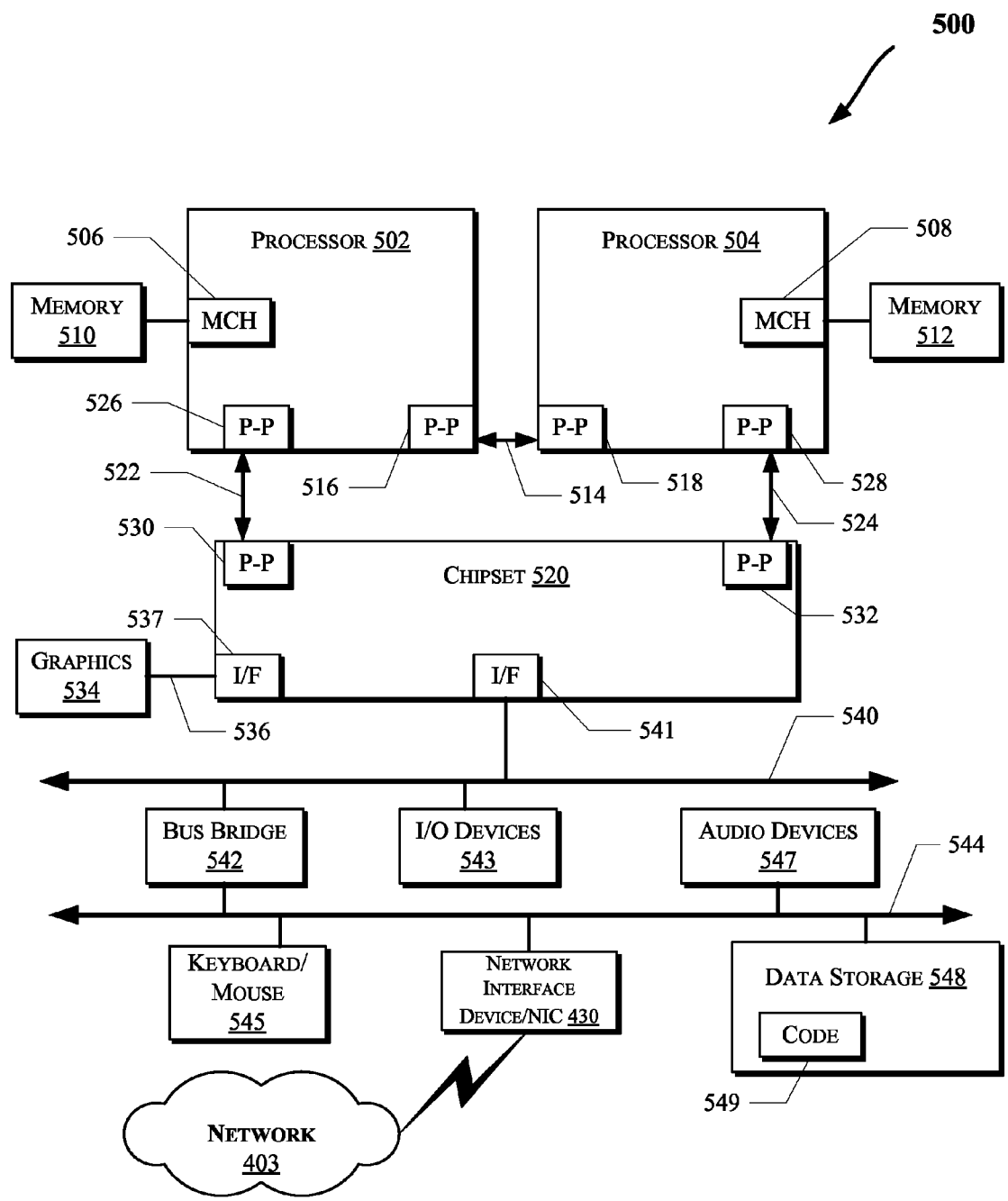

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to couple with memories 510 and 512. The memories 510 and/or 512 may store various data such as those discussed with reference to the memory 412 of FIG. 4.

The processors 502 and 504 may be any suitable processor such as those discussed with reference to the processors 402 of FIG. 4. The processors 502 and 504 may exchange data via a point-to-point (PtP) interface 514 using PtP interface circuits 516 and 518, respectively. The processors 502 and 504 may each exchange data with a chipset 520 via individual PtP interfaces 522 and 524 using point to point interface circuits 526, 528, 530, and 532. The chipset 520 may also exchange data with a high-performance graphics circuit 534 via a high-performance graphics interface 536, using a PtP interface circuit 537.

At least one embodiment of the invention may be provided by utilizing the processors 502 and 504. For example, the processors 502 and/or 504 may perform one or more of the operations of FIG. 2. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may be coupled to a bus 540 using a PtP interface circuit 541. The bus 540 may have one or more devices coupled to it, such as a bus bridge 542 and I/O devices 543. Via a bus 544, the bus bridge 542 may be coupled to other devices such as a keyboard/mouse 545, the network interface device 430 discussed with reference to FIG. 4 (such as modems, network interface cards (NICs), or the like that may be coupled to the computer network 40), audio I/O device 547, and/or a data storage device 548. The data storage device 548 may store code 549 that may be executed by the processors 502 and/or 504.

In various embodiments of the invention, the operations discussed herein, with reference to FIGS. 1-5, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer (e.g., a processor or other logic of a computing device) to perform an operation discussed herein. The machine-readable medium may include a storage device such as those discussed with respect to FIGS. 1-5.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modern, or a network connection). Accordingly, herein, an intangible carrier wave shall be regarded as comprising a machine-readable medium.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a plurality of computing nodes to form a virtual overlay;
a first computing node of the plurality of computing nodes to comprise a protocol stack, wherein the protocol stack is to comprise:

a plurality of virtual machines, wherein the first computing node is to share at least two of the plurality of virtual machines to participate in cross-layer searching operations associated with the virtual overlay and cross-layer monitoring operations associated with the virtual overlay, wherein the cross-layer searching operations are to determine a physically shortest route to obtain requested data; and wherein the cross-layer monitoring operations are to provide information corresponding to underlying networks to other nodes and other overlays to allow the other nodes and overlays to determine network conditions without the other nodes and overlays conducting cross-layer information exchange.

2. The apparatus of claim 1, wherein the first computing node is to generate a route reply for a virtual address in response to a route request, received from a second computing node from the plurality of computing nodes.

3. The apparatus of claim 2, wherein the second computing node is to transmit the route request for the virtual address via a wireless network to one or more of the plurality of computing nodes.

4. The apparatus of claim 2, wherein the route reply comprises information corresponding to a key and a value.

5. The apparatus of claim 4, further comprising hash logic to map the key to the virtual address.

6. The apparatus of claim 4, wherein the virtual address comprises an indicia to indicate to other computing nodes in the virtual overlay that the address is a virtual address.

7. The apparatus of claim 4, wherein one or more of the plurality of computing nodes comprise a memory to store one or more of the virtual address, the key, or the value.

8. The apparatus of claim 7, wherein data stored in the memory is sorted based on the virtual address.

9. The apparatus of claim 2, wherein the second computing node is to comprise a network facility to broadcast the route request to one or more of the plurality of computing nodes.

10. The apparatus of claim 1, wherein one or more of the plurality of computing nodes are to form a virtual network monitoring overlay to collect the underlying network information.

11. The apparatus of claim 10, wherein the virtual network monitoring overlay is to provide the collected information to one or more computing nodes of the plurality of computing nodes.

12. The apparatus of claim 10, wherein the collected information is to comprise one or more of periodic link quality measurements and node location information.

13. The apparatus of claim 1, wherein one or more of the plurality of nodes are to comprise multiple-input, multiple-output (MIMO) antennas.

14. A non-transitory computer-readable medium comprising one or more instructions that when executed on a processor configure the processor to:
to form a virtual overlay by a plurality of computing nodes;
share at least two of a plurality of virtual machines of a protocol stack of a first computing node of the plurality of computing nodes to participate in cross-layer searching operations associated with the virtual overlay and cross-layer monitoring operations associated with the virtual overlay, wherein the cross-layer searching operations are to determine a physically shortest route to obtain requested data; and wherein the cross-layer monitoring operations are to provide information corresponding to underlying networks to other nodes and other overlays to allow the other nodes and overlays to determine network conditions without the other nodes and overlays conducting cross-layer information exchange.

15. The non-transitory computer-readable medium of claim 14, further comprising one or more instructions that configure the processor to generate a route reply for a virtual address in response to a route request, received from a second computing node from the plurality of computing nodes.

16. The non-transitory computer-readable medium of claim 15, further comprising one or more instructions that configure the processor to hash a key to generate a virtual address, wherein the route reply is to comprise information corresponding to the key.

17. A system comprising:
a memory to store a key and a corresponding value;
a plurality of computing nodes to form a virtual overlay; and
a first computing node of the plurality of computing nodes to comprise a protocol stack, wherein the protocol stack is to comprise:
a plurality of virtual machines, wherein the first computing node is to share at least two of the plurality of virtual machines to participate in cross-layer searching operations associated with the virtual overlay and cross-layer monitoring operations associated with the virtual overlay, wherein the cross-layer searching operations are to determine a physically shortest route to obtain requested data; and wherein the cross-layer monitoring operations are to provide information corresponding to underlying networks to other nodes and other overlays to allow the other nodes and overlays to determine network conditions without the other nodes and overlays conducting cross-layer information exchange.

18. The system of claim 17, wherein the first computing node is to transmit a route request for a virtual address corresponding to the key via a wireless network to one or more of a plurality of computing nodes.

19. The system of claim 18, further comprising a second node to generate a route reply for the virtual address in response to the route request.

20. The system of claim 17, wherein the first computing node comprises a hash logic to map the key to the virtual address.

* * * * *